US012591429B2

(12) United States Patent
Noguchi et al.

(10) Patent No.: US 12,591,429 B2
(45) Date of Patent: **\*Mar. 31, 2026**

(54) MEMORY INTERFACE

(71) Applicant: Taiwan Semiconductor Manufacturing Company, Ltd., Hsinchu (TW)

(72) Inventors: Hiroki Noguchi, Hsinchu (TW); Yih Wang, Hsinchu (TW)

(73) Assignee: Taiwan Semiconductor Manufacturing Company, Ltd., Hsinchu (TW)

( \* ) Notice: Subject to any disclaimer, the term of this patent is extended or adjusted under 35 U.S.C. 154(b) by 0 days.

This patent is subject to a terminal disclaimer.

(21) Appl. No.: 18/789,121

(22) Filed: Jul. 30, 2024

(65) Prior Publication Data

US 2024/0385836 A1 Nov. 21, 2024

Related U.S. Application Data

(63) Continuation of application No. 17/726,224, filed on Apr. 21, 2022, now Pat. No. 12,112,163.

(60) Provisional application No. 63/285,901, filed on Dec. 3, 2021.

(51) Int. Cl.
*G06F 9/30* (2018.01)
*G06F 3/06* (2006.01)
*G06F 7/575* (2006.01)

(52) U.S. Cl.
CPC .......... *G06F 9/3001* (2013.01); *G06F 3/0611* (2013.01); *G06F 3/0658* (2013.01); *G06F*

*3/0673* (2013.01); *G06F 7/575* (2013.01); *G06F 9/3016* (2013.01)

(58) Field of Classification Search
None
See application file for complete search history.

(56) References Cited

U.S. PATENT DOCUMENTS

| | | | |
|---|---|---|---|
| 4,347,566 A | 8/1982 | Koda et al. | |
| 4,393,468 A | 7/1983 | New | |
| 4,689,823 A | 8/1987 | Wojcik et al. | |
| 5,619,668 A | 4/1997 | Zaidi | |
| 6,003,124 A | 12/1999 | Laborie | |
| 6,434,655 B1 * | 8/2002 | Agon .................... | G06F 3/0613 |
| | | | 365/189.08 |

(Continued)

FOREIGN PATENT DOCUMENTS

| | | |
|---|---|---|
| CN | 101401064 A | 4/2009 |
| KR | 1020170027125 A | 3/2017 |

(Continued)

OTHER PUBLICATIONS

Machine Translation of Chinese Patent Application CN 101401064 A to Manadath, 2009. (Year: 2009).

(Continued)

*Primary Examiner* — Steven G Snyder
(74) *Attorney, Agent, or Firm* — Merchant & Gould P.C.

(57) ABSTRACT

A memory interface circuit includes an instruction decoder configured to receive an instruction from a processor to generate a corresponding control code. An execution circuit is configured to receive the control code from the instruction decoder and access a memory and generate an arithmetic result according to the control code.

20 Claims, 9 Drawing Sheets

(56) References Cited

U.S. PATENT DOCUMENTS

| | | |
|---|---|---|
| 6,839,831 B2 | 1/2005 | Balmer et al. |
| 7,721,069 B2 | 5/2010 | Ramchandran et al. |
| 8,386,751 B2 | 2/2013 | Ramchandran et al. |
| 8,880,850 B2 | 11/2014 | Ramchandran et al. |
| 11,036,508 B2 | 6/2021 | Wang et al. |
| 12,112,163 B2 | 10/2024 | Noguchi et al. |
| 2002/0108026 A1 | 8/2002 | Balmer et al. |
| 2005/0246698 A1 | 11/2005 | Chung |
| 2006/0015703 A1 | 1/2006 | Ramchandran et al. |
| 2008/0244238 A1 | 10/2008 | Mitu |
| 2013/0311753 A1 | 11/2013 | Kandadai |
| 2014/0040602 A1 | 2/2014 | Jochen |
| 2017/0060588 A1 | 3/2017 | Choi |
| 2017/0147351 A1 | 5/2017 | Cho et al. |
| 2018/0336035 A1 | 11/2018 | Choi et al. |
| 2019/0108145 A1 | 4/2019 | Raghava et al. |
| 2020/0035291 A1 | 1/2020 | Kasibhatla et al. |
| 2020/0218540 A1 | 7/2020 | Kesiraju et al. |
| 2021/0096865 A1 | 4/2021 | Wang et al. |
| 2022/0012054 A1 | 1/2022 | Kim et al. |
| 2022/0188117 A1 | 6/2022 | Kalamatianos et al. |
| 2022/0188233 A1 | 6/2022 | Kalamatianos et al. |
| 2023/0131938 A1* | 4/2023 | Weber .................... G06F 3/061 |
| | | 711/154 |

FOREIGN PATENT DOCUMENTS

| | | |
|---|---|---|
| TW | 201933107 A | 8/2019 |
| WO | 99/24901 A1 | 5/1999 |

OTHER PUBLICATIONS

Machine Translation of Korean Patent Application KR 20170027125 A to Choi, 2017. (Year: 2017).

Machine Translation of Taiwanese Patent Application TWI510921 B to Jha, 2012. (Year: 2012).

* cited by examiner

| Command | CMD | Sel1 | Sel2 | Sel3 | Sel4 | Sel5 |
|---|---|---|---|---|---|---|
| Read from memory | RE | a | d | d | X | |
| Write to memory | WE | X | d | d | b | |
| LDR to register A from DIN | NOP | X | a | d | X | |
| LDR to register B from DIN | NOP | X | d | a | X | |
| LDR to register A from memory | RE | a | c | d | X | |
| LDR to register B from memory | RE | a | d | c | X | |
| STR to memory from register A | WE | a | d | d | a | Through A |
| STR to memory from register B | WE | a | d | d | a | Through B |
| AND/OR/ORR/XOR/EOR/BIC from A and B to A | NOP | b | b | d | X | AND/OR/ORR/XOR/EOR/BIC |
| AND/OR/ORR/XOR/EOR/BIC from A and B to B | NOP | b | d | b | X | AND/OR/ORR/XOR/EOR/BIC |
| AND/OR/ORR/XOR/EOR/BIC from A and B to memory | WE | b | d | d | a | AND/OR/ORR/XOR/EOR/BIC |
| CMP/CMN from A and B to register A | NOP | b | b | d | X | CMN/CMP |
| CMP/CMN from A and B to register B | NOP | b | d | b | X | CMN/CMP |
| CMP/CMN from A and B to memory | WE | b | d | d | a | CMN/CMP |
| NOT/SAR/SHR/LSL/LSR/MVN from A to register A | NOP | b | b | d | X | NOT/SAR/SHR/LSL/LSR/MVN from A |
| NOT/SAR/SHR/LSL/LSR/MVN from A to register B | NOP | b | d | b | X | |
| NOT/SAR/SHR/LSL/LSR/MVN from A to memory | WE | b | d | d | a | |
| NOT/SAR/SHR/LSL/LSR/MVN from B to register A | NOP | b | b | d | X | NOT/SAR/SHR/LSL/LSR/MVN from B |
| NOT/SAR/SHR/LSL/LSR/MVN from B to register B | NOP | b | d | b | X | |
| NOT/SAR/SHR/LSL/LSR/MVN from B to memory | WE | b | d | d | a | |

FIG. 8

MEMORY INTERFACE

CROSS-REFERENCE TO RELATED APPLICATIONS

This application is a continuation application of U.S. application Ser. No. 17/726,224, filed Apr. 21, 2022, which claims the benefit of U.S. Provisional Application No. 63/285,901, filed Dec. 3, 2021, and titled "MEMORY INTERFACE," the disclosures of which are incorporated herein by reference.

BACKGROUND

Computer systems typically employ various memory arrangements for instruction and data storage. Cache memory may be provided to speed data retrieval operations. Cache memory stores copies of data found in frequently used main memory locations. Accessing data from cache memory speeds processing because cache memory can typically be accessed faster than main memory. Multi-level cache is a structure in which there are multiple cache memories. For example, a computing system may have three levels, i.e. an L1 cache, an L2 cache, and an L3 cache. Typically, in a multi-level cache configuration, L1 is the smallest and with a short access time. If requested data is not found in L1 cache, the system searches the L2 cache, which is usually than L1 cache and physically further away than the L1 cache, thus, with a greater access time. If the data are not found in the L2 cache, the L3 cache is searched. However, if requested data is not found in cache memory, then it may be necessary to retrieve the required data from main memory.

Fetching data from the physical memory by the system's central processing unit (CPU) is time consuming. The associated data latency includes a long round trip latency of the CPU to transmit an instruction to the memory, and the memory to return the specified data to the CPU. Some data-access applications, such as data base operations, artificial intelligence (AI), big data, etc. often involve significant memory access transactions for search and comparison.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

FIG. 8 is a chart illustrating examples of memory instructions and associated control codes in accordance with some embodiments.

DETAILED DESCRIPTION

Figure 1:
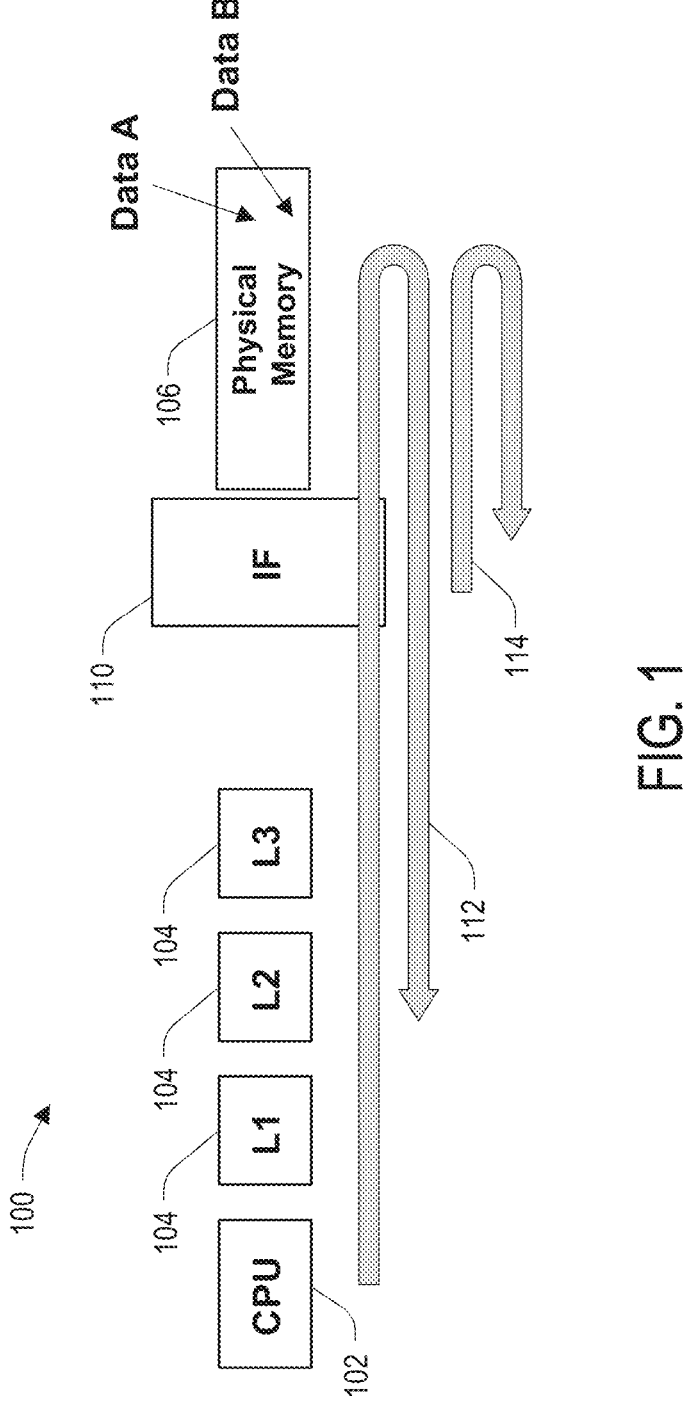
FIG. 1 is a block diagram illustrating an example of a computer system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some computing processes are very memory intensive, requiring many memory accesses for functions such as search and comparison. For instance, Computer artificial intelligence ("AI") uses deep learning techniques, where a computing system may be organized as a neural network. A neural network refers to a plurality of interconnected processing nodes that enable the analysis of data, for example. Neural networks compute "weights" to perform computation on new input data. Neural networks use multiple layers of computational nodes, where deeper layers perform computations based on results of computations performed by higher layers.

Machine learning (ML) involves computer algorithms that may improve automatically through experience and by the use of data. It is seen as a part of artificial intelligence. Machine learning algorithms build a model based on sample data, known as "training data" in order to make predictions or decisions without being explicitly programmed to do so.

Neural networks may include a plurality of interconnected processing nodes that enable the analysis of data to compare an input to such "trained" data. Trained data refers to computational analysis of properties of known data to develop models to use to compare input data. An example of an application of AI and data training is found in object recognition, where a system analyzes the properties of many (e.g., thousands or more) of images to determine patterns that can be used to perform statistical analysis to identify an input object.

Thus, machine learning is very computationally intensive with the computation and comparison of many different data elements, requiring significant memory accesses. Other computer applications, such as database applications including big data also involve many data accesses. In such data intensive operations, data movement can consume a majority of memory access transactions.

Computer systems typically employ various memory arrangements for instruction and data storage. Cache memory may be provided to speed data retrieval operations. Cache memory stores copies of data found in frequently used main memory locations. Accessing data from cache memory speeds processing because cache memory can typically be accessed faster than main memory. Multi-level cache is a structure in which there are multiple cache memories. For example, a computing system may have three levels, i.e. an L1 cache, an L2 cache, and an L3 cache. Typically, in a multi-level cache configuration, L1 is the smallest and with a short access time. If requested data is not found in L1 cache, the system searches the L2 cache, which is usually than L1 cache and physically further away than the L1 cache, thus, with a greater access time. If the data are not found in the L2 cache, the L3 cache is searched.

However, if requested data is not found in cache memory, then it may be necessary to retrieve the required data from main memory. Many computing processes, such as the intensive data-access applications discussed above may require significant accesses to main memory.

Fetching data from the physical or main memory by the computer system's processor or central processing unit (CPU) is time consuming. The associated data latency includes a long "round trip" latency of the CPU to transmit an instruction to the memory, and the memory to return the specified data to the CPU.

In accordance with aspects of the disclosure, a memory interface circuit is coupled between a memory, such as the system's main physical memory and a processor (i.e. CPU). The interface circuit includes an instruction decoder coupled to the memory. The instruction decoder is configured to receive an instruction from the processor to generate a corresponding control code. An execution circuit is coupled to the memory and the instruction decoder, and is configured to access the memory and generate a result according to the control code. In this manner, memory-related instructions (e.g. logic functions, comparison, move, copy, etc.) are carried out by the execution circuit (rather than the CPU itself) close to the memory, significantly reducing the "round trip" length and associated data latency.

In some examples, a memory instruction execution unit and an instruction decoder are added to a memory interface. This provides support for executing memory-related instructions in addition to simple read/write instructions by the memory interface. In this manner, a memory acceleration capability is provided. The memory interface can execute certain specific predetermined instructions independently as a computing unit, which leads to reduced memory accesses between the CPU and memory. Certain functions such as, for example, logic functions (AND, OR, XOR, NOT, etc.), comparison, move, copy, etc. become faster as a result.

An instruction handler provides instruction executions related to memory access. In some examples, the execution unit includes a data input terminal configured to receive data to be written to the memory based on a control code generated by the instruction decoder. The execution unit may further include a data output terminal configured to receive data read from the memory based on a control code generated by the instruction decoder. Further, some examples of the execution unit include an arithmetic-logic unit (ALU) configured to execute logic operations based on the control codes generated by the instruction decoder. For example, the ALU may include inputs connected to corresponding registers. Multiplexers (MUX) have output terminals coupled to input terminals of the registers to provide data based on control codes generated by the instruction decoder.

FIG. 1 illustrates an example of a computer system 100 in accordance with some embodiments of the disclosure. The system 100 includes a processor or CPU 102, one or more cache memories 104, a memory interface 110, and a memory 106. In the embodiment shown, the memory 106 is a main memory in the computer system 100. Further, the memory 106 has a storage capacity greater than each of the cache memories 104.

Each cache memory 104 is a random access memory (RAM) that the processor 102 can access more quickly. The cache memory 104 is used to store copies of data stored in the memory 106 that are frequently used by the processor 102. Therefore, the processor 102 can perform operations or tasks with the cache memory 104, to decrease operation time or power consumption of the system 100. In some embodiments, memory type of the memory 106 (e.g. SRAM) is different from the memory type of the cache memory 104 (e.g. DRAM). In some embodiments, the memory type of the memory 106 is the same as the memory type of the cache memory 104.

Figure 2:
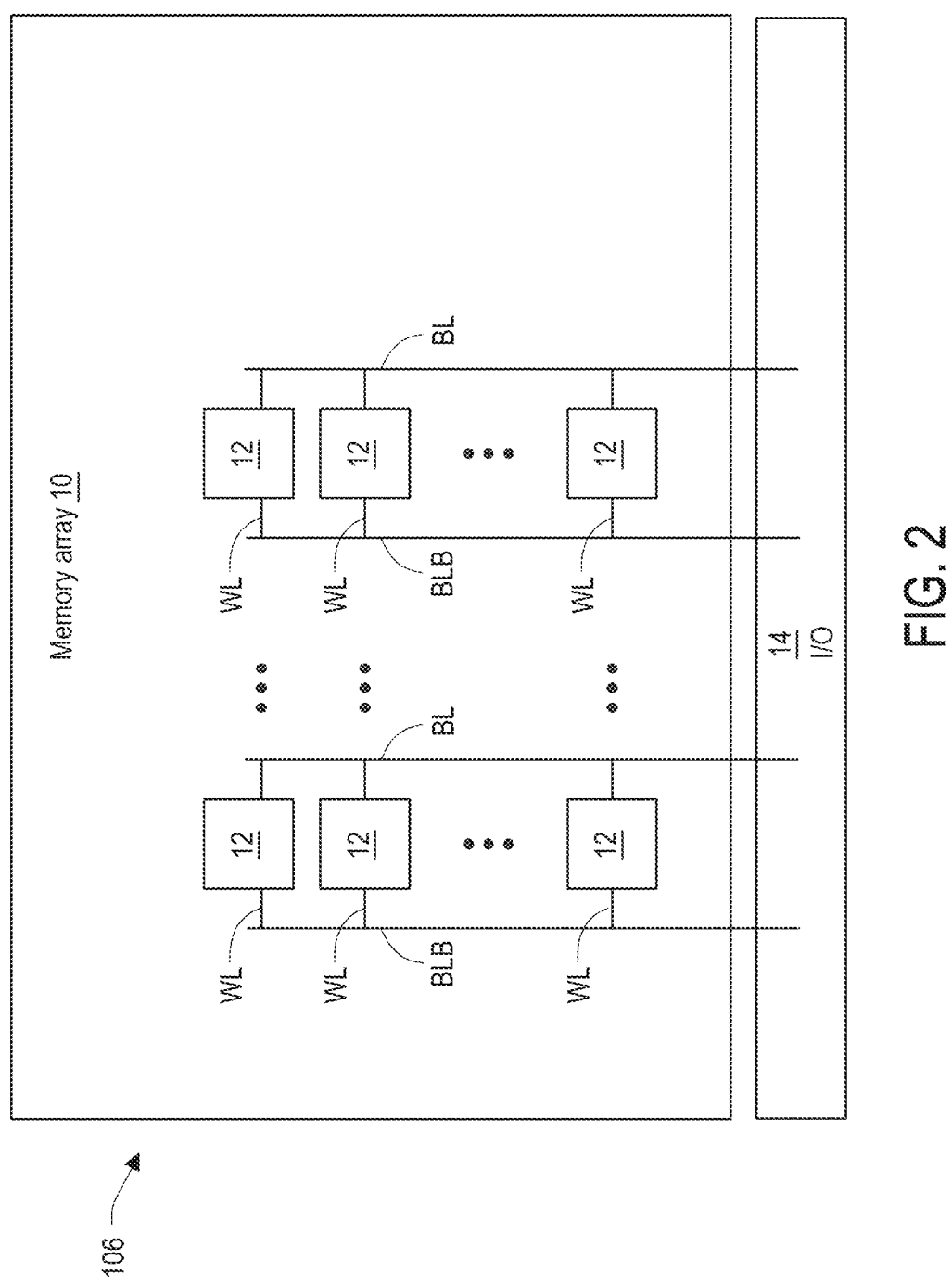
FIG. 2 is a block diagram illustrating an example of a memory array of the computer system shown in FIG. 1 in accordance with some embodiments.

FIG. 2 is a block diagram illustrating aspects of an example of the memory 106 in accordance with some embodiments. In the example shown, the memory 106 includes one or more memory arrays 10, which include a plurality of memory cells 12, or bit-cells. The memory 106 also includes an input/output (I/O) circuit 14 that is connected to the memory interface 110. The memory cells 12 and I/O 14 may be coupled by complementary bit lines BL and BLB, and data can be read from and written to the memory cells 12 via the complementary bit lines BL and BLB.

As noted above, in some examples the memory 106 is an SRAM memory. In such examples, the memory cells 12 are SRAM cells. However, the disclosed memory 106 is not limited to SRAM memory.

Figure 3:
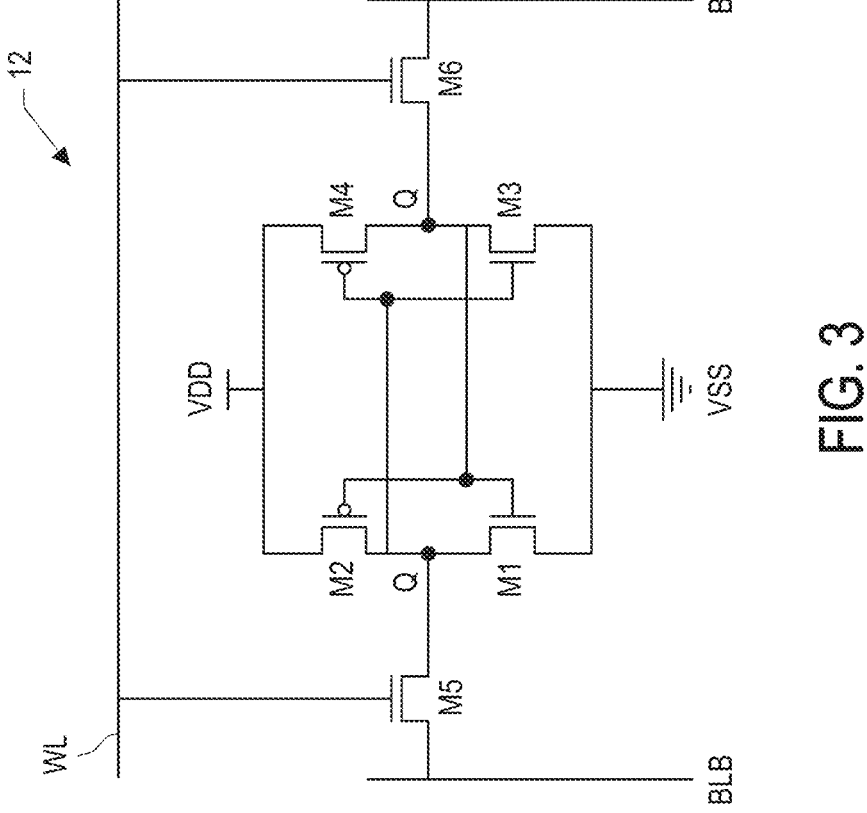
FIG. 3 is a schematic diagram illustrating an example of a memory cell of the memory array shown in FIG. 2 in accordance with some embodiments.

FIG. 3 is a circuit diagram illustrating an example SRAM memory cell 12 in accordance with some embodiments. The memory cell 12 includes but is not limited to a six-transistor (6T) SRAM structure. In some embodiments more or fewer than six transistors may be used to implement the memory cell 12. For example, the memory cell 12 in some embodiments may use a 4T, 8T or 10T SRAM structure, and in other embodiments may include a memory-like bit-cell or a building unit. The memory cell 12 includes a first inverter formed by a NMOS/PMOS transistor pair M1 and M2, a second inverter formed by a NMOS/PMOS transistor pair M3 and M4, and access transistors/pass gates M5 and M6. Transistors M1, M3, M5 and M6 include n-type metal-oxide-semiconductor (NMOS) transistors, and transistors M2 and M4 include p-type metal-oxide semiconductor (PMOS) transistors.

The first and second inverters are cross coupled to each other to form a latching circuit for data storage. A first terminal of each of transistors M2 and M4 is coupled to a power supply VDD, while a first terminal of each of transistors M1 and M3 is coupled to a reference Voltage VSS, for example, ground. A gate of the pass gate transistor M6 is coupled to a word line WL. A drain of the pass gate transistor M6 is coupled to a bit line BL. Moreover, a first terminal of the pass gate transistor M6 is coupled to second terminals of transistors M4 and M3 and also to gates of M2 and M1 at the node Q. Similarly, a gate of the pass gate transistor M5 is coupled to the word line WL. A drain of the pass gate transistor M5 is coupled to a complementary bit line BLB. Moreover, a first terminal of the pass gate transistor M5 is coupled to second terminals of transistors M2 and M1 and also to gates of transistors M4 and M3 at the node Qbar.

Returning to FIG. 1, in the system 100, the processor can access the memory 106 via the memory interface 110, which includes an address decoder (discussed further below). The address decoder is capable of decoding an address from the processor 102 to a physical location of the memory 106. As noted above, some computer applications such as database, big data, AI, etc. may require many accesses to the main memory 106. For example, for a simple compare operation in which the processor 102 is to compare data A and data B, several separate memory accesses may be required as indicated by the "round trip" arrow 112. The processor sends an instruction including a memory address for data A, which is decoded by the address decoder of the interface 110. Based on this memory address, data A is read from the memory 106 and returned to the processor 102. This process is repeated to retrieve data B, and then the processor 102 can execute the desired compare operation.

These data fetches from the memory 106 by the processor 102 can result in significant data latency because of the time required for the processor 106 to transmit an instruction to the memory 106, and the memory 106 to return the specified data to the processor 102 as indicated by the long round trip arrow 112.

In accordance with aspects of the present disclosure, the memory interface 110 includes a memory instruction execution unit and an instruction decoder. This facilitates executing memory-related instructions by the memory interface 110, rather than executing such instructions by the processor 102 itself. In this manner, a memory acceleration capability is provided. The memory interface 110 executes certain predetermined instructions independently as a computing unit, which leads to reduced memory access latency. Certain functions such as, for example, logic functions (AND, OR, XOR, NOT, etc.), comparison, move, copy, etc. are executed by the memory interface 110 rather than the processor 102. Data access distance between the memory interface 110 and the memory 106 is much shorter, resulting in a significantly shorter round trip as indicated by the shorter round trip arrow 114.

Figure 4:
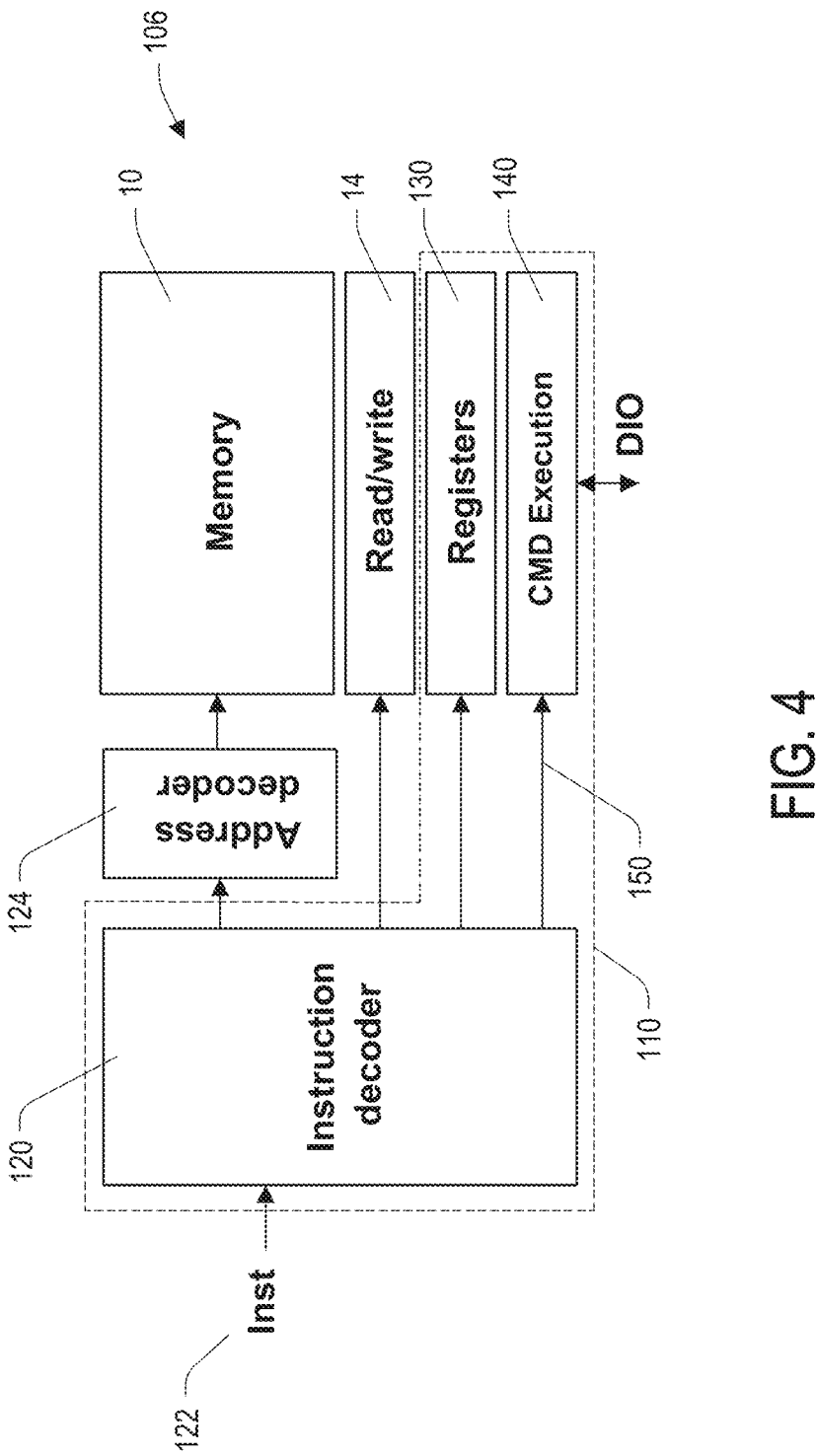
FIG. 4 is a block diagram illustrating aspects of an example memory interface in accordance with some embodiments.

FIG. 4 illustrates aspects of an example of the memory interface 110. The memory interface 110 includes an instruction decoder 120, which is configured to receive an instruction 122 or request from the processor 106. The instruction 122 may include a command and a memory address. The instruction 122 is provided to an address decoder 124, which may be a component of the interface 110 or external thereto. The address decoder 124 decodes the memory address from the instruction 122 and based thereon, provides an address command to the memory 106. The memory 106 may include a memory array, such as the SRAM memory array 10 shown in FIG. 2, as well as the read/write I/O circuit 14.

The memory interface 110 further includes registers 130 providing temporary storage of data read from the memory 106, for example. Functions of the registers 130 will be discussed further below. The memory interface 110 additionally includes a command execution circuit 140. In general, the command execution circuit 140 is configured to execute memory-related commands on data that may be written to and/or read from the memory 106. As will be discussed further below, the command execution circuit 140 may include one or more logic circuits, or an arithmetic-logic unit (ALU).

Based on the received instruction 122, the instruction decoder 120 is further configured to generate control codes 150 that correspond to the instruction 122. These control codes 150 are received by the command execution circuit 140, and based thereon, the command execution circuit 140 generates an arithmetic result. In some examples, the command execution circuit performs the logic or arithmetic operations on data retrieved from the memory based on the memory address command output by the address decoder 124. Outputs of the command execution circuit 140 may be provided to the processor 102 and/or written to the memory 106.

Figure 5:
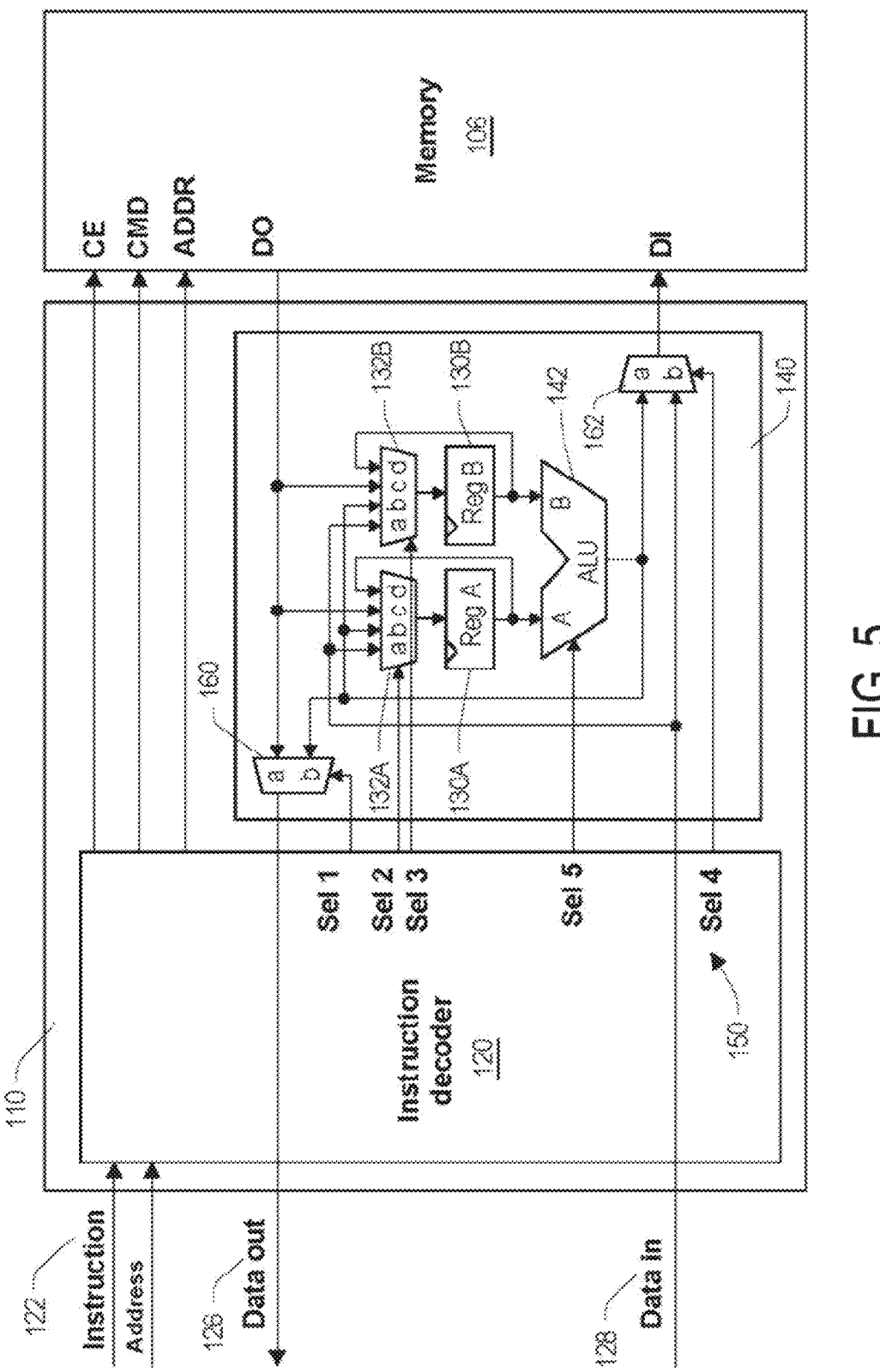
FIG. 5 is a block diagram illustrating further aspects of an example memory interface in accordance with some embodiments.

FIG. 5 illustrates further aspects of an embodiment of the memory interface 110. In the example of FIG. 5, the command execution circuit 140 includes an ALU 142 that generates the arithmetic result. The memory 106, which may be an integrated circuit (IC) memory chip, has a chip enable input terminal CE, a command input terminal CMD, and an address input terminal ADDR, each of which is connected to a corresponding output of the instruction decoder 120. The memory 106 further includes a data output terminal DO that provides data retrieved from the appropriate memory location based on the received address command, and a data input terminal DI that receives data to be written to a memory location based on the received address command.

In addition to outputting the chip enable, memory command, and address command, instruction decoder 120 provides a plurality of control codes 150 the command execution circuit 140. In the example shown in FIG. 5, the instruction decoder 120 outputs five control codes Sel 1, Sel 2, Sel 3, Sel 4 and Sel 5. The control codes 150 determine what data is input and output by the memory interface 110, and also determine what arithmetic operations are to be performed on the data.

In the example shown in FIG. 5, the command execution circuit 140 is configured to selectively output data read from the memory (e.g. via the data output terminal DO) or the arithmetic result generated by the ALU 142. Thus, control codes 150 generated by the instruction decoder 120 include a read control code Sel 1. The command execution circuit 140 includes a read multiplexer (MUX) 160 that has a first input terminal a connected to the data output terminal DO of the memory 106 to receive data read from the memory 106. A second input terminal b of the read MUX 160 is connected to an output terminal of the ALU 142 to receive the arithmetic result generated thereby. The read MUX 160 further has a control terminal connected to receive the read control code Sel 1 from the instruction decoder 120. The read control code Sel 1 controls the read MUX 160 to selectively output the data received from data output terminal DO of the memory 106 or the output of the ALU 142 at a data out terminal 126 of the memory interface 110. Data output by the data out terminal 126 may be provided to, for example, the processor 102, the cache memory 104, and/or other components or devices of the computing system 100.

The control codes 150 out by the instruction decoder 120 further include a write control code Sel 4 that is received by a control terminal of a write MUX 162. The write MUX 162 has a first input terminal a connected to the output terminal of the ALU 142, and a second input terminal b connected to receive input data from a data in terminal 128 of the memory interface 110. The data in terminal 128 may receive input data from the processor 102 or other input device. The write MUX 162 further has an output terminal connected to the data input terminal DI of the memory 106. Based on the write control code Sel 4, the write MUX 162 outputs the arithmetic output of the ALU 142 received on its first input terminal a, or input data from the data in terminal 128 received on its second input terminal b to the data input terminal DI of the memory 106 to be written to the identified address of the memory 106.

The control codes 150 generated by the instruction decoder 120 further include a command code Sel 5 that identifies the command to be executed on data input to the ALU 142. The command code Sel 5 is output from the instruction decoder 122 a control input of the ALU 142. Examples of the command codes will be discussed further here and below. The ALU circuit 142 has a first data input terminal A and a second data input terminal B. A first register 130A and a second register 130B have output terminals respectively connected to the input terminals A and B of the ALU circuit 142.

Moreover, the command execution circuit 140 includes a first input data MUX 132A with an output terminal connected to an input terminal of the first register 130A, and a second input data MUX 132B with an output terminal connected to an input terminal of the second register 130B. The first and second input data MUXs 132A, 132B each have a first input terminal a connected to the data in terminal 128 to receive input data, a second input terminal b connected to the output terminal of the ALU 142, a third input terminal c connected to the data output terminal DO of the memory 106, and a fourth input terminal d connected to the output terminals of the respective first and second registers 130A and 130B.

The control codes 150 output by the instruction decoder 102 include a first data select code Sel 2 output to a control input terminal of the first input data MUX 132A, and a second data select code Sel 3 output to a control input terminal of the second input data MUX 132B. The first data select code Sel 2 and the second data select code Sel 3 thus control their respective MUXs 132A, 132B to output the data received at the selected input terminals a-d.

As noted above, the execution circuit 140 may be configured to execute various commands, especially memory-related commands on data read from the memory 106 or data to be written to the memory 106. Such memory-related commands may include, for example, read from memory commands, write to memory commands, load register commands, store register value to memory commands, logic commands (e.g. AND, OR, ORR, XOR, EOR, BIC), compare and compare negative commands, shift commands, and the like.

Figure 6:
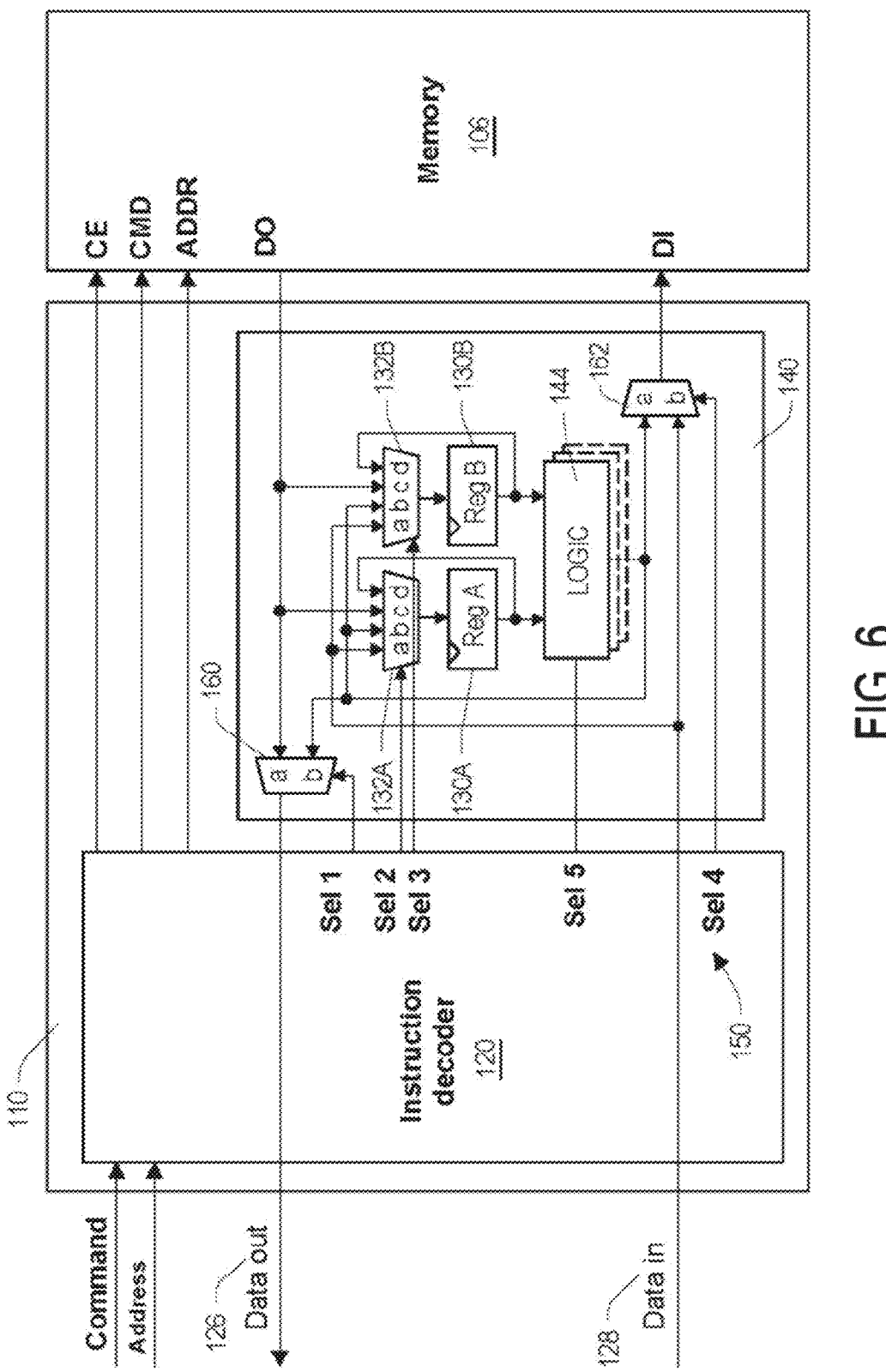
FIG. 6 is a block diagram illustrating further aspects of another example memory interface in accordance with some embodiments.

FIG. 6 illustrates another embodiment in which the command execution circuit 140 includes one or more discrete logic circuits 144. If execution of a specific or customized set of commands is desired, one or more logic circuits such as AND, OR, ORR, XOR, EOR, BIC logic circuits may be employed. In such an embodiment, the command control code Sel 5 is configured to select the desired logic circuit 144 to execute the selected logic function on the data stored in the registers 130A and 130B as selected by the control codes Sel 2 and Sel 3.

Figure 7:
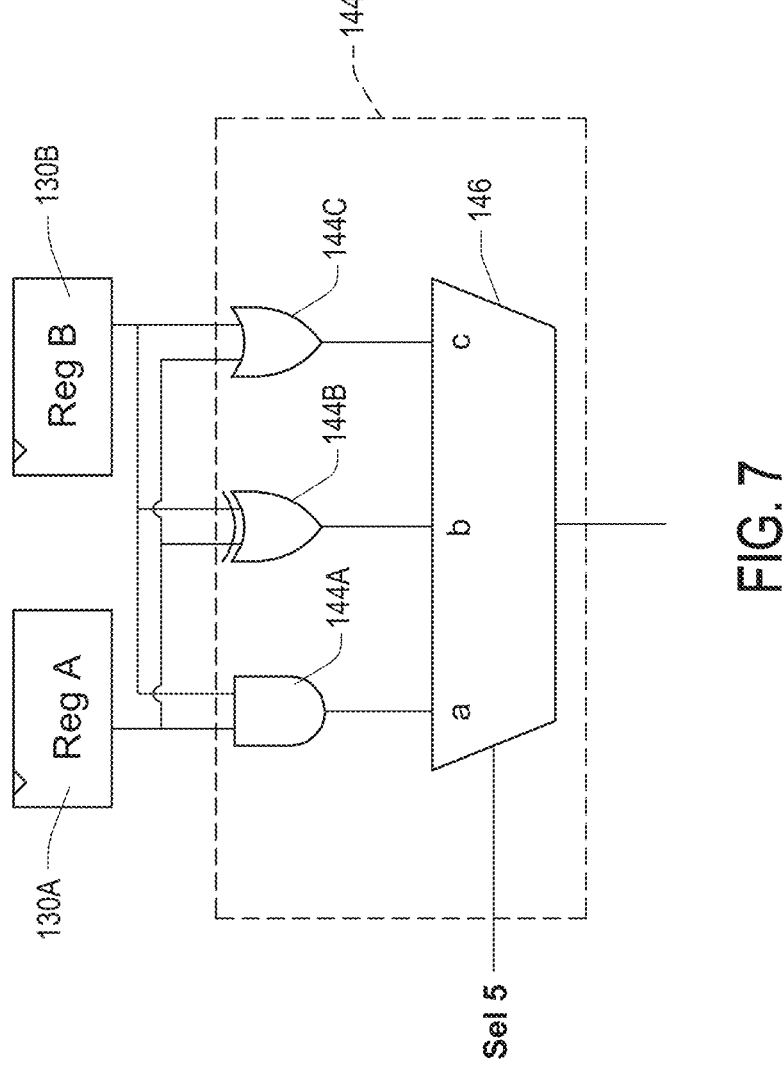
FIG. 7 is a block diagram illustrating an example of additional aspects of the memory interface shown in FIG. 6 in accordance with some embodiments.

FIG. 7 illustrates an example of the logic circuits 144 of the embodiment shown in FIG. 6. In FIG. 7, the logic circuits 144 include an AND circuit 144a, and XOR circuit 144B and an OR circuit 144C. Each of the logic circuits 144 shown in the example of FIG. 7 are two-input logic gates, with one input terminal of each logic circuit 144 connected to the output terminal of the first register 130A and the other input terminal connected to the output terminal of the second register 130B. A 3-1 MUX 146 has its first input terminal a connected to the output of the AND circuit 144A, it second input terminal b connected to the output of the XOR circuit 144B, and its third input terminal c connected to the output of the OR circuit 144C. The command control code Sel 5 is received by a control terminal of the MUX 146 to select the desired logic circuit 144 output. Remaining aspects of the memory interface 110 shown in FIG. 6 are similar to those discussed in conjunction with FIG. 5 and as such, are not repeated here. The embodiment shown in FIGS. 6 and 7 facilitates customizing complex logic such as multiply-accumulate operations, add log operations and the like. Such specific arithmetic circuits may be used in place of the ALU for specific applications such as AI, CIM, physics systems, etc.

FIG. 8 is a chart illustrating examples of various commands executed by the execution circuit 140 in some embodiments. FIG. 8 lists examples of commands generated by the instruction decoder 120 based on received instructions 122, as well as memory operation commands CMD provided to the memory 106. The instruction decoder 120 outputs the various control codes Sel 1-5 to implement the decoded commands. Thus, FIG. 8 illustrates examples of commands and the outputs of the corresponding control codes Sel 1-5.

Referring to FIG. 8 together with FIG. 5, the illustrated memory-related commands include a read from memory command, where data corresponding to the memory address is read from the memory 106 and output at the data output terminal 126 of the memory interface 110. As such, for the read from memory command the execution circuit 140 does not perform an operation on the retrieved data. Instead, the data retrieved from the identified memory address is simply passed through the memory interface 110 from the data output terminal DO of the memory number 106 to the data out terminal 126 of the memory interface 110. Thus, for the read from memory command, the read enable RE memory CMD is asserted and the read control command Sel 1 outputs a to the control terminal of the read MUX 160 such that the read MUX 160 provides the output at its first input a to the data out terminal 126. The first and second data select codes Sel 2 and Sel 3 provide output d to the control terminals of the first and second input data MUXs 132A and 132B, respectively, such that the data stored in the respective registers 130A, 130B is unchanged. Since the data retrieved from the memory 106 is passed through the memory interface 110 to the data output terminal 126, no output by the write control code Sel 4 or the command control code Sel 5 is necessary.

Similarly to the read from memory command, the write to memory command provides data from the data input terminal 128 of the memory interface 110 to the data in terminal DI of the memory 106. To write data to the memory 106, the write enable WE memory CMD is asserted. Again, data is passed through the memory interface 110 without an operation performed thereon by the ALU 142. Thus, the write control code Sel 4 outputs b to the write control MUX 162 such that data received at its b input from the data in terminal 128 of the memory interface 110 is output to the data in terminal DI of the memory 106. The first and second data select codes Sel 2 and Sel 3 provide output d to the control terminals of the first and second input data MUXs 132A and 132B, respectively, such that the data stored in the respective registers 130A, 130B is unchanged. Since the data to be written to the memory 106 is passed through the memory interface 110 to the data in terminal DI, no output by the read control code Sel 1 or the command control code Sel 5 is necessary.

The commands listed in FIG. 8 include several load register commands LDR, in which data is loaded to the first or second registers 132A or 132B. For the LDR to register A from DIN command, data is loaded to the first register 132A from the data input terminal 128. As such, no memory operation is required (i.e. memory CMD is NOP). Thus, the first data select control code Sel 2 outputs a to the control terminal of the first input data MUX 132A so that data received on the data input terminal 128 at the a input of the first input data MUX 132A is output to the first register 130A. The second data select control code Sel 3 outputs d to the control input of the second input data MUX 132B, so that the data stored in the second register 130B is unchanged. No output is provided by the read control code Sel 1 or the write control code Sel 4.

For the LDR to register B from DIN command, data is loaded to the second register 132B from the data input terminal 128. Thus, the second data select control code Sel 3 outputs a to the control terminal of the second input data MUX 132B so that data received on the data input terminal 128 at the a input of the second input data MUX 132B is output to the second register 130B. The first data select control code Sel 2 outputs d to the control input of the first input data MUX 132A, so that the data stored in the first register 130A is unchanged. No output is provided by the read control code Sel 1 or the write control code Sel 4.

The LDR to register A or register B commands from memory each require a read from memory, where data read from the appropriate address of the memory 106 is output from the data output terminal DO of the memory 106 and loaded to the appropriate register 130A or 130B. For the LDR to register A from memory command, the read enable RE CMD is asserted and the read control code Sel 1 outputs a to the read MUX 160 to implement the read from memory. The first data select code Sel 2 outputs c so the data read from the data out terminal DO of the memory 106 to the c input of the first input data MUX 132A is output to the first register (i.e. A register) 130A. The second data select code Sel 3 outputs d to the control terminal of the second input data MUX 132B so that the data stored in the second register 130B is unchanged. No output is necessary for the write control code Sel 4 or the command control code Sel 5.

Similarly, the LDR to register B from memory command results in the read control code Sel 1 outputting a to the read MUX 160 to implement the read from memory. The second data select code Sel 3 outputs c so the data read from the data out terminal DO of the memory 106 to the c input of the second input data MUX 132B is output to the second register (i.e. B register) 130B. The first data select code Sel 2 outputs d to the control terminal of the first data input MUX 132A so that the data stored in the first register 130A is unchanged. No output is necessary for the write control code Sel 4 or the command control code Sel 5.

The store register value to memory (STR) commands result in writing the data stored in the selected register 130A or 130B to the memory 106. Thus, the data is output from the selected register 130A or 130B, passed through the respective input of the ALU 142 to the data input terminal DI of the memory 106. For the STR to memory from register A command, a write to memory is required so the write enable WE CMD is asserted. The read control code Sel 1 and the write control code Sel 3 each output a to the control input of the respective read MUX 160 and write MUX 162. The first and second data select codes Sel 2 and Sel 3 each output d to the control inputs of the respective first and second registers 130A and 130B to output the data currently stored in the registers to the respective A and B inputs of the ALU 142. For the STR to memory from register A command, the command control code Sel 5 outputs "Through A" so that data received on the A input of the ALU 142 from the first register 130A is output to the write MUX 162. For the STR to memory from register B command, the command control code Sel 5 outputs "Through B" so that data received on the B input of the ALU 142 from the second register 130B is output to the write MUX 162.

The example commands listed in FIG. 8 further include several logic operations, such as and (AND), or (OR), bitwise or (ORR), exclusive or (XOR), bitwise exclusive or (EOR), and bit clear (BIC). The logic commands specify the logic function to be executed and whether the result is to be stored to a register 130A or 130B, or to the memory 106. If the output of the ALU 142 is to be stored in register A or B (i.e. the first register 130A or second register 103B), no memory operation (i.e. NOP) is required. For the AND/OR/ORR/XOR/EOR/BIC from A and B to A command, the read control code Sel 1 outputs b to the control terminal of the read MUX 160 to select the b input of the read MUX 160, which is connected to the output terminal of the ALU 142. The first data select control code Sel 2 outputs b to the control terminal of the first input data MUX 132A, which is connected to the output terminal of the ALU 142, thus providing the ALU output to the first register 130A. The second data select control code Sel 3 outputs d to the control terminal of the second input data box 132B so that the data stored in the second register 130B remains unchanged. No output is required from the write control code Sel 4. The command control cold Sel 5 provides the appropriate logic function (i.e. AND/OR/ORR/XOR/EOR/BIC) to the control input of the ALU 142.

For the AND/OR/ORR/XOR/EOR/BIC from A and B to B command, the read control code Sel 1 outputs b to the control terminal of the read MUX 160 to select the b input of the read MUX 160, which is connected to the output terminal of the ALU 142. The second data select control code Sel 3 outputs b to the control terminal of the second input data MUX 132B, which is connected to the output terminal of the ALU 142, thus providing the ALU output to the second register 130B. The first data select control code Sel 2 outputs d to the control terminal of the first input data MUX 132A so that the data stored in the first register 130A remains unchanged. No output is required from the write control code Sel 4. The command control code Sel 5 provides the appropriate logic function (i.e. AND/OR/ORR/XOR/EOR/BIC) to the control input of the ALU 142.

The AND/OR/ORR/XOR/EOR/BIC from A and B to memory command writes the result of the logic function on the data stored in the first and second registers 130A and 130B to the memory 106. Since a write to the memory 106 is required, a write enable WE CMD is asserted. The read control code Sel 1 outputs b to the control terminal of the read MUX 160 to select the b input of the read MUX 160, which is connected to the output terminal of the ALU 142. The first data select control code Sel 2 and the second data select control code Sel 3 both output d to the control terminals of their respective input data MUXs 132A and 132B so that the data stored in the corresponding registers 130A and 130B remains unchanged. The write control code Sel 4 outputs a to the control terminal of the write MUX 162 to provide the output of the ALU 142 to the data in terminal DI of the memory 106 so that the results of the logic operation are written to the memory 106. The command control code Sel 5 provides the appropriate logic function (i.e. AND/OR/ORR/XOR/EOR/BIC) to the control input of the ALU 142.

Compare commands also can be performed by the ALU 142 to avoid the long round-trip 112 shown in FIG. 1. The example commands listed in FIG. 8 include storing results of the compare CMP and compare negative CMN operations in the registers 130A or 130B, or the memory 106. Since the CMP/CMN from A and B to register A and the CMP/CMN from A and B to register B commands do not require a memory operation, the no operation NOP memory command is asserted. For the CMP/CMN from A and B to register A command, the read control code Sel 1 outputs b to the control terminal of the read MUX 160 to select the b input of the read MUX 160, which is connected to the output terminal of the ALU 142. The first data select control code Sel 2 outputs b to the control terminal of the first input data MUX 132A, which is connected to the output terminal of the ALU 142, thus providing the ALU output for the CMP or CMN operation to the first register 130A. The second data select control code Sel 3 outputs d to the control terminal of the second input data box 132B so that the data stored in the second register 130B remains unchanged. No output is required from the write control code Sel 4. The command control cold Sel 5 provides the appropriate compare function (i.e. CMP or CMN) to the control input of the ALU 142.

For the CMP/CMN from A and B to register B command, the read control code Sel 1 outputs b to the control terminal of the read MUX 160 to select the b input of the read MUX 160, which is connected to the output terminal of the ALU 142. The second data select control code Sel 3 outputs b to the control terminal of the second input data MUX 132B, which is connected to the output terminal of the ALU 142, thus providing the ALU output to the second register 130B. The first data select control code Sel 2 outputs d to the control terminal of the first input data MUX 132A so that the data stored in the first register 130A remains unchanged. No output is required from the write control code Sel 4. The command control code Sel 5 provides the appropriate compare function (i.e. CMP or CMN) to the control input of the ALU 142.

The CMP/CMN from A and B to memory command writes the result of the logic function on the data stored in the first and second registers 130A and 130B to the memory 106. Since a write to the memory 106 is required, a write enable WE CMD is asserted. The read control code Sel 1 outputs b to the control terminal of the read MUX 160 to select the b input of the read MUX 160, which is connected to the output terminal of the ALU 142. The first data select control code Sel 2 and the second data select control code Sel 3 both output d to the control terminals of their respective input data MUXs 132A and 132B so that the data stored in the corresponding registers 130A and 130B remains unchanged. The write control code Sel 4 outputs a to the control terminal of the write MUX 162 to provide the output of the ALU 142 to the data in terminal DI of the memory 106 so that the results of the compare operation are written to the memory 106. The command control code Sel 5 provides the appropriate compare function (i.e. CMP/CMN) to the control input of the ALU 142.

The memory-related commands listed in FIG. 8 further includes several shift commands such as bit complement (NOT), shift arithmetic right (SAR), shift right (SHR), logical shift left (LSL), logical shift right (LSR), and move NOT (MVN). These commands specify both the register containing the data upon which the command is executed, as well as the location for storing the result (i.e. register A, register B, or the memory 106).

For the NOT/SAR/SHR/LSL/LSR/MVN from A or B to register A commands, the read control code Sel 1 outputs b to the control terminal of the read MUX 160 to select the b input of the read MUX 160, which is connected to the output terminal of the ALU 142. The first data select control code Sel 2 outputs b to the control terminal of the first input data MUX 132A, which is connected to the output terminal of the ALU 142, thus providing the ALU output for the CMP or CMN operation to the first register 130A. The second data select control code Sel 3 outputs d to the control terminal of the second input data box 132B so that the data stored in the second register 130B remains unchanged. No output is required from the write control code Sel 4, as no memory operation (i.e. NOP CMD) is required. The command control cold Sel 5 provides the appropriate shift function (i.e. NOT/SAR/SHR/LSL/LSR/MVN) and identifies the desired input (i.e. from A or from B) to the control input of the ALU 142.

For the NOT/SAR/SHR/LSL/LSR/MVN from A or B to register B commands, the read control code Sel 1 outputs b to the control terminal of the read MUX 160 to select the b input of the read MUX 160, which is connected to the output terminal of the ALU 142. The second data select control code Sel 3 outputs b to the control terminal of the second input data MUX 132B, which is connected to the output terminal of the ALU 142, thus providing the ALU output to the second register 130B. The first data select control code Sel 2 outputs d to the control terminal of the first input data MUX 132A so that the data stored in the first register 130A remains unchanged. No output is required from the write control code Sel 4. The command control code Sel 5 provides the appropriate shift function (i.e. NOT/SAR/SHR/LSL/LSR/MVN) along with the A or B input (i.e. from A or from B) to the control input of the ALU 142.

The NOT/SAR/SHR/LSL/LSR/MVN from A or B to memory command writes the result of the shift function on the data stored in the first register 130A or the second register 130B to the memory 106. Since a write to the memory 106 is required for these commands, a write enable WE is asserted. The read control code Sel 1 outputs b to the control terminal of the read MUX 160 to select the b input of the read MUX 160, which is connected to the output terminal of the ALU 142. The first data select control code Sel 2 and the second data select control code Sel 3 both output d to the control terminals of their respective input data MUXs 132A and 132B so that the data stored in the corresponding registers 130A and 130B remains unchanged. The write control code Sel 4 outputs a to the control terminal of the write MUX 162 to provide the output of the ALU 142 to the data in terminal DI of the memory 106 so that the results of the shift operation are written to the memory 106. The command control code Sel 5 provides the appropriate shift function (i.e. NOT/SAR/SHR/LSL/LSR/MVN) and identification of the ALU 142 input (i.e. from A or from B) to the control input of the ALU 142.

Figure 9:
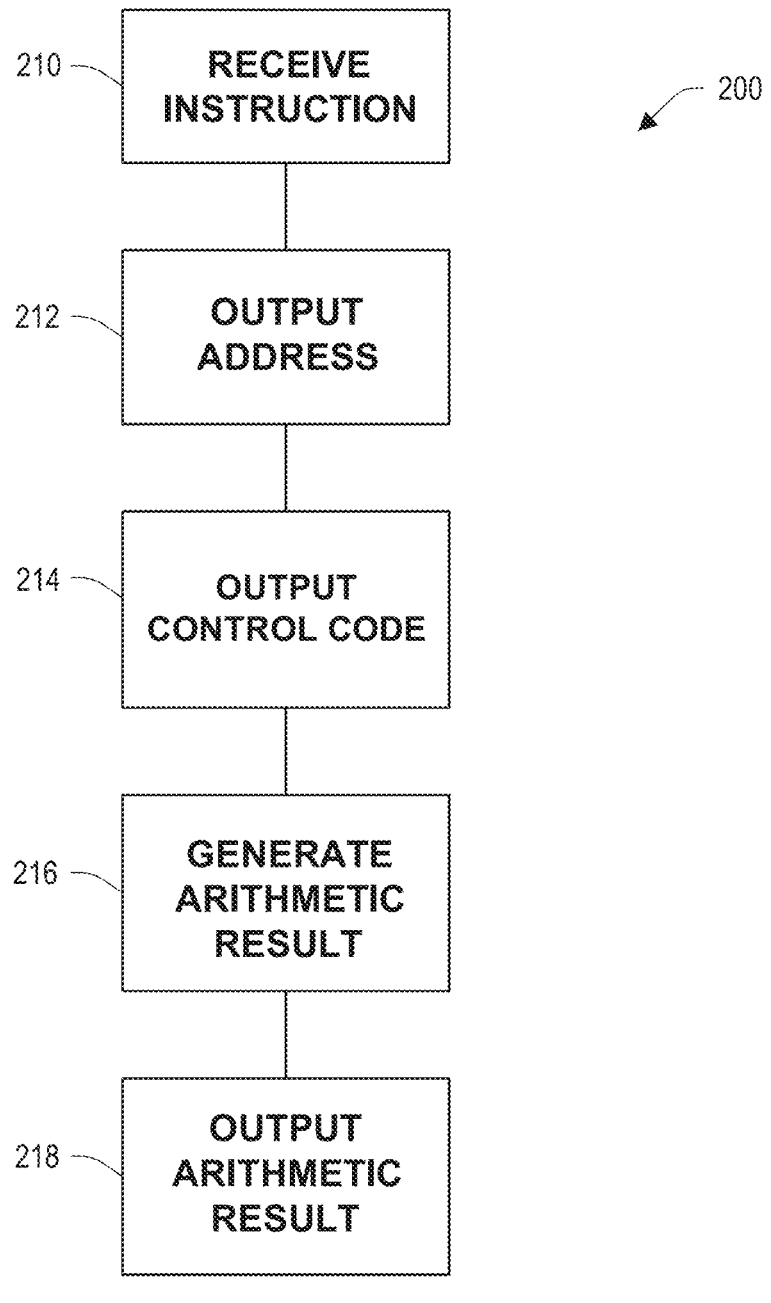
FIG. 9 is a flow diagram illustrating an example of a method in accordance with some embodiments.

FIG. 9 is flow diagram illustrating an example of a memory interface method 200 in accordance with disclosed embodiments. The method 200 may be implemented by the examples of the execution circuit 140 discussed above. Referring to FIG. 9 together with FIG. 5, the method 200 includes an operation 210 where an instruction from the processor 102 is received by the instruction decoder 120 of the memory interface 110. A memory address command is output based on the instruction to a memory by the instruction decoder 120 at operation 212. At operation 214, the control code 150 is output to the execution circuit 140, which is connected to the memory 106. An arithmetic result is generated by the execution circuit 140 based on the control code at operation 216, and the arithmetic result is output by the execution circuit 140 at operation 218.

As noted above, the arithmetic result output by the execution circuit 140 may be based on data read from the memory 106 based on the memory address, and wherein the arithmetic result may be output to the processor 102 by the execution circuit 140. Still further, the arithmetic result may be based on input data, such as data received from the processor 102 and input to the execution circuit 140. The arithmetic result may be written to the memory 106 based on the memory address command.

Disclosed embodiments thus include a memory interface circuit that includes an instruction decoder configured to receive an instruction from a processor to generate a corresponding control code. An execution circuit is configured to receive the control code from the instruction decoder and access a memory and generate an arithmetic result according to the control code.

In accordance with further aspects, a computing device includes a processor, a memory, and an address decoder connected between the processor and the memory. The address decoder is configured to receive a memory address from the processor, decode the address, and output an address command to the memory. An instruction decoder is connected between the processor and the memory, and is configured to receive an instruction from the processor, decode the instruction, and output a command to the memory. The instruction decoder is further configured to output a plurality of control codes based on the received instruction. An execution circuit has a data output terminal connected to the processor, a write data input terminal configured to receive input data, and a read data input terminal configured to receive data retrieved from the memory based on the address command. The execution circuit is configured to provide one of an arithmetic result or the data retrieved from the memory at the data output terminal based on the plurality of control codes.

In accordance with still further disclosed aspects, a memory interface method includes receiving an instruction from a processor by an instruction decoder. A memory address command based on the instruction to a memory is output by the instruction decoder. A control code is output to an execution circuit connected to the memory. An arithmetic result is generated by the execution circuit based on the control code, and the arithmetic result is output by the execution circuit.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory interface circuit, comprising:

an instruction decoder configured to receive an instruction from a processor to generate a corresponding control code; and an execution circuit including a logic circuit, wherein the execution circuit is configured to:

receive the control code from the instruction decoder;

access a memory;

retrieve data stored in the memory; and generate an arithmetic result according to the control code based on the retrieved data;

wherein the plurality of control codes includes a read control code, and wherein the execution circuit includes a read multiplexer (MUX) having a first input terminal connected to a read data input terminal, a second input terminal connected to receive the arithmetic result, a control terminal connected to receive the read control code, and a data output terminal, wherein the read MUX is configured to output the one of the retrieved data or the arithmetic result in response to the read control code;

wherein the logic circuit includes:

a first data input terminal;

a second data input terminal;

a control terminal, wherein the plurality of control codes includes a command code received by the control terminal of the logic circuit; and an output terminal configured to provide the generated arithmetic result; and wherein the execution circuit includes:

a first register having an output terminal connected to the first data input terminal of the logic circuit; and a second register having an output terminal connected to the second data input terminal of the logic circuit;

a first input data MUX having an output terminal connected to an input terminal of the first register;

a second input data MUX having an output terminal connected to an input terminal of the second register;

wherein the first input data MUX and the second input data MUX each include:

a first input terminal connected to the write data input terminal;

a second input terminal connected to the output terminal of the logic circuit;

a third input terminal connected to the read data input terminal;

a fourth input terminal, wherein the fourth input terminal of the first input data MUX is connected to the output terminal of the first register, and the fourth input terminal of the second input data MUX is connected to the output terminal of the second register; and a control terminal, wherein the plurality of control codes includes a first data select code received by the control terminal of the first input data MUX, and a second data select code received by the control terminal of the second input data MUX.

2. The interface circuit of claim 1, wherein the instruction received by the instruction decoder includes a command and a memory address.

3. The interface circuit of claim 2, wherein the execution circuit is configured to receive data retrieved by the memory based on the memory address.

4. The interface circuit of claim 1, wherein the execution circuit is configured to selectively output one of the retrieved data or the arithmetic result.

5. The interface circuit of claim 1, wherein the control code includes a write control code, and wherein the execution circuit includes a write MUX having a first input terminal, a second input terminal, a control terminal and a data output terminal, the first input terminal connected to receive the arithmetic result, the second input terminal connected to receive input data, the control terminal connected to receive the write control code, and the data output terminal configured to output one of the received data or the arithmetic result to the memory in response to the write control code.

6. The interface circuit of claim 1, wherein the logic circuit includes an AND circuit, an XOR circuit, and an OR circuit.

7. The interface circuit of claim 6, wherein each of the AND circuit, the XOR circuit, and the OR circuit includes two input terminals, with one input terminal connected to the output terminal of the first register and another input terminal connected to the output terminal of the second register.

8. The interface circuit of claim 6, wherein the logic circuit includes a 3-input multiplexer that has a first input terminal connected to an output of the AND circuit, a second input terminal connected to an output of the XOR circuit, and a third input terminal connected to an output of the OR circuit.

9. The interface circuit of claim 8, wherein the control terminal of the logic circuit is connected to the 3-input multiplexer to receive the command code to output one of the inputs of the 3-input multiplexer.

10. The interface circuit of claim 1, wherein the memory is an SRAM memory.

11. A computing device, comprising:
a processor;
a memory;
an address decoder connected between the processor and the memory, and configured to receive a memory address from the processor, decode the memory address, and output an address command to the memory;
an instruction decoder connected between the processor and the memory, and configured to receive an instruction from the processor, decode the instruction, and output a command to the memory, the instruction decoder further configured to output a plurality of control codes based on the received instruction; and
an execution circuit including a logic circuit, a data output terminal connected to the processor, a write data input terminal configured to receive input data, and a read data input terminal configured to receive data retrieved from the memory based on the address command, wherein the execution circuit is configured to provide one of an arithmetic result or the data retrieved from the memory at the data output terminal based on the plurality of control codes;
wherein the plurality of control codes includes a read control code, and the execution circuit includes a read multiplexer (MUX) having a first input terminal connected to the read data input terminal, a second input terminal connected to receive the arithmetic result, a control terminal connected to receive the read control code, and the data output terminal, wherein the read MUX is configured to output the one of the retrieved data or the arithmetic result in response to the read control code;

wherein the logic circuit includes:
a first data input terminal;
a second data input terminal;
a control terminal, wherein the plurality of control codes includes a command code received by the control terminal of the logic circuit; and
an output terminal configured to provide the generated arithmetic result; and
wherein the execution circuit includes:
a first register having an output terminal connected to the first data input terminal of the logic circuit; and
a second register having an output terminal connected to the second data input terminal of the logic circuit;
a first input data MUX having an output terminal connected to an input terminal of the first register;
a second input data MUX having an output terminal connected to an input terminal of the second register;
wherein the first input data MUX and the second input data MUX each include:
a first input terminal connected to the write data input terminal;
a second input terminal connected to the output terminal of the logic circuit;
a third input terminal connected to the read data input terminal;
a fourth input terminal, wherein the fourth input terminal of the first input data MUX is connected to the output terminal of the first register, and the fourth input terminal of the second input data MUX is connected to the output terminal of the second register; and
a control terminal, wherein the plurality of control codes includes a first data select code received by the control terminal of the first input data MUX, and a second data select code received by the control terminal of the second input data MUX.

12. The device of claim 11, comprising a cache memory connected between the processor and the execution circuit.

13. The device of claim 12, wherein the cache memory is configured to receive data from the data output terminal of the execution circuit.

14. The device of claim 11, wherein the plurality of control codes includes a write control code, and the execution circuit includes a write MUX having a first input terminal connected to the output terminal of the logic circuit, a second input terminal connected to the write data input terminal, and a control terminal connected to receive the write control code.

15. The device of claim 11, wherein the logic circuit includes an AND circuit, an XOR circuit, and an OR circuit, and each of the AND circuit, the XOR circuit, and the OR circuit includes two input terminals, with one input terminal connected to the output terminal of the first register and another input terminal connected to the output terminal of the second register.

16. The device of claim 15, wherein the logic circuit includes a 3-input multiplexer that has a first input terminal connected to an output of the AND circuit, a second input terminal connected to an output of the XOR circuit, and a third input terminal connected to an output of the OR circuit.

17. The device of claim 16, wherein the control terminal of the logic circuit is connected to the 3-input multiplexer to receive the command code to output one of the inputs of the 3-input multiplexer.

18. A method, comprising:

receiving an instruction from a processor by an instruction decoder;

outputting a memory address command based on the instruction to a memory by the instruction decoder;

outputting a control code to an execution circuit connected to the memory, wherein the control code includes a read control code;

receiving data read from the memory by the execution circuit based on the memory address command;

generating an arithmetic result by a logic circuit of the execution circuit based on the control code and the data read from the memory; and outputting the arithmetic result by the logic circuit;

wherein the execution circuit includes a read multiplexer (MUX) having a first input terminal connected to the read data input terminal, a second input terminal connected to receive the arithmetic result, a control terminal connected to receive the read control code, and the data output terminal, wherein the read MUX is configured to output the one of the retrieved data or the arithmetic result in response to the read control code; and wherein the logic circuit includes:

a first data input terminal;

a second data input terminal;

a control terminal, wherein the plurality of control codes includes a command code received by the control terminal of the logic circuit; and an output terminal configured to provide the generated arithmetic result; and wherein the execution circuit includes:

a first register having an output terminal connected to the first data input terminal of the logic circuit; and a second register having an output terminal connected to the second data input terminal of the logic circuit;

a first input data MUX having an output terminal connected to an input terminal of the first register;

a second input data MUX having an output terminal connected to an input terminal of the second register;

wherein the first input data MUX and the second input data MUX each include:

a first input terminal connected to the write data input terminal;

a second input terminal connected to the output terminal of the logic circuit;

a third input terminal connected to the read data input terminal;

a fourth input terminal, wherein the fourth input terminal of the first input data MUX is connected to the output terminal of the first register, and the fourth input terminal of the second input data MUX is connected to the output terminal of the second register; and a control terminal, wherein the plurality of control codes includes a first data select code received by the control terminal of the first input data MUX, and a second data select code received by the control terminal of the second input data MUX.

19. The method of claim 18, wherein the arithmetic result is output to the processor.

20. The method of claim 18, wherein the arithmetic result is further based on data received from the processor, and wherein the arithmetic result is written to the memory based on the memory address command.

* * * * *